(No Model.)
J. F. TAYLOR.
Apparatus for Stowing Cotton Bales in Vessels.
No. 241,752. Patented May 17, 1881.
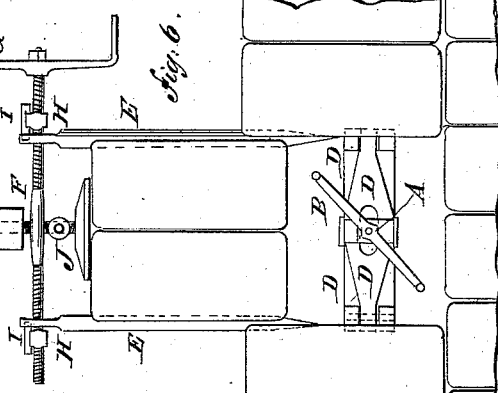
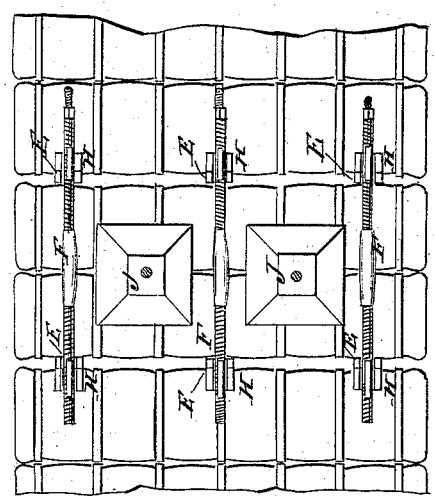
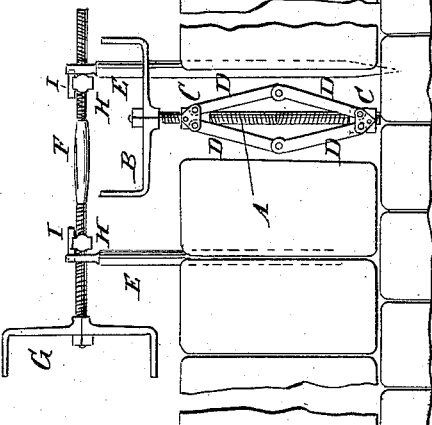
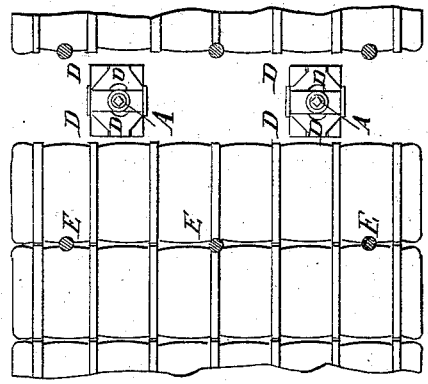
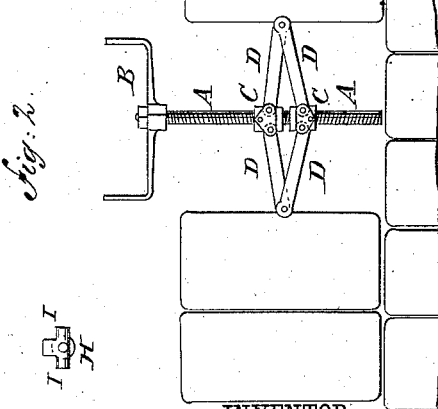
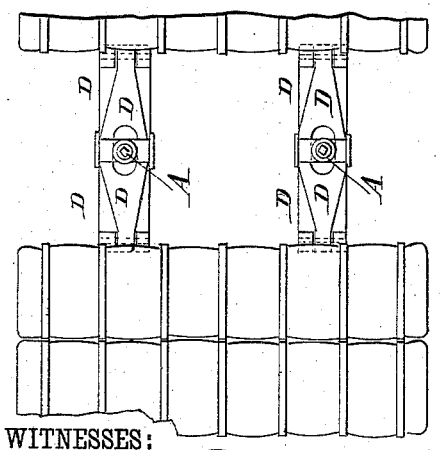
WITNESSES:
Chas. Nida
C. Sedgwick
INVENTOR:
J. F. Taylor
BY Munn & Co.
ATTORNEYS.

UNITED STATES PATENT OFFICE.

JOHN F. TAYLOR, OF SHARON SPRINGS, NEW YORK.

APPARATUS FOR STOWING COTTON-BALES IN VESSELS.

SPECIFICATION forming part of Letters Patent No. 241,752, dated May 17, 1881.

Application filed April 14, 1881. (No model.)

*To all whom it may concern:*

Be it known that I, JOHN F. TAYLOR, of Sharon Springs, in the county of Schoharie and State of New York, have invented a new and useful Improvement in Apparatus for Stowing Cotton-Bales in Vessels, of which the following is a full, clear, and exact description.

Figure 1 is a plan view of a part of my improvement. Fig. 2 is a side elevation of the same. Fig. 3 is a plan view, partly in section, of my improvement. Fig. 4 is a side elevation of the same. Fig. 5 is a plan view of the improvement, the jack-screws being shown in section. Fig. 6 is a side elevation of the same. Fig. 7 is a side elevation of one of the guide-posts. Fig. 8 represents one of the nuts.

Similar letters of reference indicate corresponding parts.

The object of this invention is to facilitate the stowing of cotton-bales in vessels, and enable the stevedores to stow a much greater quantity in a vessel than is possible when the stowing is done in the ordinary manner.

The invention consists in the combination, with a right-and-left screw, of nuts carrying toggle-bars for forcing the middle bales of a tier apart; also, in the combination, with a right-and-left screw, of posts having slots in their upper ends, and separate nuts having side lugs for holding the bales of a tier in place when the middle bales are pressed apart, and also in the method of stowing cotton-bales in vessels, which consists in forcing the middle bales of a tier apart by toggle-bars operated by right-and-left screws, holding them apart by posts operated by right-and-left screws, and inserting in the space between the said middle bales other bales, one at a time and successively, and forcing a key bale or bales into the final space by a jack-screw or other suitable means, as will be hereinafter fully described.

A is a right-and-left screw, to the upper end of which is attached a lever-handle, B, for convenience in turning the screw. Upon each screw A are placed two nuts, C, to the opposite sides of which are hinged the inner ends of pairs of toggle-bars D. The outer ends of the bars D of each pair are hinged to each other, as shown in Figs. 2 and 4. The toggle-bars D are made wide to give them a broad bearing against the bales.

E are metal posts, the lower ends of which are pointed and their upper ends are slotted, as shown in Fig. 7.

F is a right-and-left screw, to one end of which is attached a lever-handle, G, for convenience in turning it. The screw F is similar to the screw A, except that the right and left threads need not meet. Upon each screw F are placed two nuts, H, to rest against the inner sides of the notched upper ends of the posts E, as shown in Fig. 4, to press them apart or against the outer sides of the said posts, as shown in Fig. 6, to press them toward each other. The nuts H have lugs I upon their opposite sides, one or the other of which enters the slots of the posts E, to hold the said nuts from turning when the screw F is turned.

J represents an ordinary jack-screw.

In using my improvement, a row of cotton-bales is placed across the hold of the vessel, the bales being placed upon their edges and side by side. One or more of the toggle-screws A B C D, with their toggles contracted, are placed between two bales in the middle of the row, and the screws are turned to expand the toggles and press the bales together toward the opposite sides of the vessel. Two or more of the posts E are then placed upon the opposite sides of the space formed between the bales by the toggle-screws, the points of the posts being forced into boards placed upon the floor of the hold in the case of the first tier of bales, and into the bales of a lower tier in the case of succeeding tiers. The screws F are then placed in the slots in the upper ends of the posts E, with the nuts H upon the inner sides of the said ends, and the said screws are turned to force the upper ends of the said posts apart and hold the bales in place when the toggle-screws are unscrewed to release them from pressure. The toggle-screws are then taken out, another bale is put into the space between the posts E, the toggle-screws are again put in, and the bales pressed toward the sides of the vessel, and so on until the bales can be forced no closer and there is only space for one or two bales. The toggle-screws are then turned down sidewise and operated to force the bales between which they are placed as far apart as possible. The lower parts of the posts E are then placed between the upper parts of the bales, one or more bales are placed between the posts, and the screws F are put in place with the nuts H upon the outer sides of the said posts E. The screws are then turned to draw the upper ends of the said posts E toward each other, clamping and compressing the interposed bale or bales until the said bale or bales can pass down into the space between the bales held apart by the toggle-screws. The bale or bales between the posts E are then forced down by jack-screws J, or by the weight of the men getting upon them, the toggle-screws being removed as the key bale or bales approach them. In this operation the posts E serve as guides and ways to the bales while being forced down into place. In this way much more cotton can be stowed in a vessel's hold than is possible when the ordinary method of stowing is used.

Having thus described my invention, I claim as new and desire to secure by Letters Patent—

1. An apparatus for stowing cotton-bales, or bales containing similar articles, containing the following elements, namely: a right-and-left screw operating a pair of toggle-bars, and a separate right-and-left screw operating a pair of wedging-posts, substantially as herein shown and described.

2. In an apparatus for stowing cotton-bales in vessels, the combination, with the right-and-left screw A, of the nuts C and toggle bars D, substantially as herein shown and described, whereby the bales in a tier can be pressed closely together, as set forth.

3. In an apparatus for stowing cotton-bales in vessels, the combination, with the right-and-left screw F, of the slotted posts E and nuts H, substantially as herein shown and described, whereby the bales can be held in place while inserting another bale, as set forth.

4. In an apparatus for stowing cotton, the nuts H, constructed with laterally-projecting lugs I, substantially as herein shown and described, whereby the nuts will be held from turning by the posts E, and can be readily applied to either side of the said posts, as set forth.

5. The method of stowing cotton-bales in vessels, substantially as herein shown and described, which consists in forcing the middle bales of a tier apart by toggle-bars operated by right-and-left screws, holding them apart by posts operated by right-and-left screws, and inserting in the space between the said middle bales other bales, one at a time and successively, and forcing a key bale or bales into the final space by a jack-screw or other suitable means, as set forth.

JOHN FISHER TAYLOR.

Witnesses:
HENRY BROWN,
JANE A. SPRONG.